United States Patent
Huang et al.

(10) Patent No.: US 10,656,344 B2
(45) Date of Patent: May 19, 2020

(54) OPTICAL FIBER PLUG, OPTICAL FIBER ADAPTER, AND OPTICAL FIBER CONNECTOR ASSEMBLY

(71) Applicant: HUAWEI TECHNOLOGIES CO., LTD., Shenzhen, Guangdong (CN)

(72) Inventors: Xuesong Huang, Dongguan (CN); Bo Yang, Wuhan (CN); Wenxin Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/369,257

(22) Filed: Mar. 29, 2019

(65) Prior Publication Data
US 2019/0227244 A1 Jul. 25, 2019

Related U.S. Application Data

(63) Continuation of application No. PCT/CN2016/101039, filed on Sep. 30, 2016.

(51) Int. Cl.
*G02B 6/38* (2006.01)
*G02B 6/44* (2006.01)

(52) U.S. Cl.
CPC ........... *G02B 6/3873* (2013.01); *G02B 6/381* (2013.01); *G02B 6/3825* (2013.01); *G02B 6/3857* (2013.01); *G02B 6/3891* (2013.01); *G02B 6/4476* (2013.01); *G02B 6/3849* (2013.01)

(58) Field of Classification Search
CPC .. G02B 6/3873; G02B 6/3857; G02B 6/4476; G02B 6/381; G02B 6/3849; G02B 6/3825; G02B 6/3891; G02B 6/38
See application file for complete search history.

(56) References Cited

U.S. PATENT DOCUMENTS

| 5,067,783 A | 11/1991 | Lampert |
| 5,662,488 A | 9/1997 | Alden |
| 5,796,897 A | 8/1998 | Ronan |

(Continued)

FOREIGN PATENT DOCUMENTS

| CN | 102870023 A | 1/2013 |
| CN | 104199152 A | 12/2014 |

(Continued)

OTHER PUBLICATIONS

Extended European Search Report issued in European Application No. 16917259.0 dated Sep. 3, 2019.

(Continued)

*Primary Examiner* — Ryan A Lepisto
(74) *Attorney, Agent, or Firm* — Fish & Richardson P.C.

(57) ABSTRACT

The present disclosure relates to optical fiber plugs, optical fiber adapters, and optical fiber connector assemblies. One example optical fiber plug includes a ferrule, a sleeve, and a lock cap. At least one lock block is disposed on an inner wall of the lock cap. The at least one lock block is configured to be engaged and locked with a lock slot on an optical fiber adapter. Two stop blocks are disposed on the inner wall of the lock cap. A stop rod is disposed on an outer wall of the sleeve. The stop rod is located between the two stop blocks. The lock cap rotates relative to the sleeve within an angle range limited by the two stop blocks.

19 Claims, 5 Drawing Sheets

(56) References Cited

U.S. PATENT DOCUMENTS

| | | |
|---|---|---|
| 6,371,660 B1 | 4/2002 | Roehrs et al. |
| 7,467,896 B2 | 4/2008 | Melton et al. |
| 7,708,469 B2 | 5/2010 | Liu et al. |
| 2015/0260924 A1* | 9/2015 | Huang ................ G02B 6/3825 385/60 |
| 2015/0260926 A1* | 9/2015 | Wu ..................... G02B 6/3869 385/60 |

FOREIGN PATENT DOCUMENTS

| | | |
|---|---|---|
| CN | 105339822 A | 2/2016 |
| CN | 205049780 U | 2/2016 |
| EP | 0997757 B1 | 9/2004 |
| EP | 2894501 A1 | 7/2015 |
| WO | 2015070382 A1 | 5/2015 |

OTHER PUBLICATIONS

PCT International Search Report and Written Opinion in International Appln. No. PCT/CN2016/101039, dated May 17, 2017, 17 pages (with English translation).

Office Action issued in Russian Application No. 2019113137/28 dated Dec. 18, 2019, 12 pages (with English translation).

Search Report issued in Russian Application No. 2019113137/28 dated Dec. 17, 2019, 4 pages (with English translation).

\* cited by examiner

OPTICAL FIBER PLUG, OPTICAL FIBER ADAPTER, AND OPTICAL FIBER CONNECTOR ASSEMBLY

CROSS-REFERENCE TO RELATED APPLICATION

This application is a continuation of International Patent Application No. PCT/CN2016/101039 filed on Sep. 30, 2016, the disclosure of which is hereby incorporated by reference in its entirety.

TECHNICAL FIELD

The present invention relates to the field of fiber optic communications, and in particular, to an optical fiber plug, an optical fiber adapter, and an optical fiber connector assembly.

BACKGROUND

An optical fiber connector assembly is a device by which optical fibers are detachably (removably) connected. The optical fiber connector assembly mainly includes two parts: an optical fiber plug and an optical fiber adapter.

In an existing optical fiber connector assembly, an optical fiber plug and an optical fiber adapter are usually connected and locked in an undiversified threaded connection manner. Therefore, multiple circles of rotation are required during locking and detaching. Consequently, an operation is complex and relatively time-consuming.

SUMMARY

Embodiments of the present invention provide an optical fiber plug, an optical fiber adapter, and an optical fiber connector assembly, to resolve the following problem: An operation during locking and detaching is complex and relatively time-consuming because in an existing optical fiber connector assembly, an optical fiber plug and an optical fiber adapter are connected and locked in an undiversified threaded connection manner. The technical solutions are as follows:

According to a first aspect, an embodiment of the present invention provides an optical fiber plug, where the optical fiber plug includes a ferrule, a sleeve sleeved on the outside of the ferrule, and a lock cap rotatably sleeved on the sleeve, where at least one lock block is disposed on an inner wall of the lock cap, and the lock block is configured to be engaged and locked with a lock slot on an optical fiber adapter;

two stop blocks are disposed on the inner wall of the lock cap, the two stop blocks are arranged at intervals along a circumferential direction of the lock cap, a stop rod is disposed on an outer wall of the sleeve, and the stop rod is located between the two stop blocks, so that the lock cap rotates relative to the sleeve within an angle range limited by the two stop blocks; and when the optical fiber plug and the optical fiber adapter are interconnected by circumferentially aligning the sleeve with the optical fiber adapter, the lock block can be led to a lock location on the lock slot from a horn-shaped opening of the lock slot if the lock cap rotates relative to the sleeve to any location.

In this embodiment of the present invention, an optical fiber is sheathed in the ferrule. During an optical fiber connection, the optical fiber plug and the optical fiber adapter are interconnected, so that the optical fiber may be interconnected to an optical fiber of an optical fiber plug (a common optical fiber plug) connected to another side of the optical fiber adapter. The sleeve is disposed on the outside of the ferrule of the optical fiber plug, the lock cap is limitedly rotatably sleeved on the outside of the sleeve, and the lock block is disposed on the inner wall of the lock cap, so that the lock block is engaged and locked with the lock slot on the optical fiber adapter. During specific locking, because the two stop blocks matching the stop rod on the outer wall of the sleeve are further disposed on the inner wall of the lock cap, the lock cap rotates relative to the sleeve within the angle range limited by the two stop blocks. When the optical fiber plug and the optical fiber adapter are interconnected by circumferentially aligning the sleeve with the optical fiber adapter, the lock block can be led to the lock location on the lock slot from the horn-shaped opening of the lock slot if the lock cap rotates relative to the sleeve to any location. That is, provided that the ferrule and the sleeve are inserted into the optical fiber adapter, the lock block can be led to the lock location on the lock slot, so that locking and fastening are completed. When the optical fiber plug is connected to or detached from the optical fiber adapter, there is no need to perform multiple circles of rotation like a threaded connection manner. Therefore, an operation is simple and less time-consuming.

A shape of the lock block includes but is not limited to a cuboid, a truncated pyramid, a cylinder, and a truncated cone.

A shape of the stop block includes but is not limited to a cuboid, a truncated pyramid, a cylinder, and a truncated cone.

With reference to the first aspect, in a first implementation of the first aspect, the angle range limited by the two stop blocks is from 30 degrees to 90 degrees.

In this implementation, the angle range limited by the two stop blocks is set to 30 degrees to 90 degrees. Therefore, on the one hand, a rotatable range of the lock block is not excessively large and a rotation amplitude of the lock cap during locking is reduced, to facilitate an operation of a user to operate. On the other hand, the rotatable range of the lock block is not excessively small, to ensure a locking effect obtained between the optical fiber plug and the optical fiber adapter.

Preferably, the angle range limited by the two stop blocks is 45 degrees.

With reference to the first aspect or the first implementation of the first aspect, in a second implementation of the first aspect, two lock blocks are disposed on the inner wall of the lock cap, and an angle between the two lock blocks is preferably 180 degrees.

In this implementation, the locking effect obtained between the optical fiber plug and the optical fiber adapter may be reinforced by disposing two symmetrically distributed lock blocks and then correspondingly disposing two lock slots on the optical fiber adapter.

With reference to the first aspect, or the first implementation or the second implementation of the first aspect, in a third implementation of the first aspect, at least a part of the sleeve protrudes from one end of the lock cap, an end that is of the sleeve and protrudes from the lock cap is provided with an open slot engaged with a locating key of the optical fiber adapter, and the open slot axially extends from an end portion of the sleeve.

In this implementation, the sleeve is provided with the axially arranged open slot, and the open slot is configured to engage with the locating key of the optical fiber adapter, so as to locate the optical fiber plug and the optical fiber adapter and interconnect the optical fiber plug to the optical fiber adapter. In this case, a part of the sleeve extends out of the lock cap, so as to facilitate an interconnection operation between the open slot and the optical fiber adapter.

With reference to the third implementation of the first aspect, in a fourth implementation of the first aspect, an opening of the open slot of the sleeve is horn-shaped, so as to facilitate the interconnection between the optical fiber plug and the optical fiber adapter.

With reference to the third implementation of the first aspect, in a fifth implementation of the first aspect, the end that is of the sleeve and protrudes from the lock cap protrudes from an end face of the ferrule, so that the lock cap may protect the ferrule.

With reference to any one of the first aspect, or the first implementation to the fifth implementation of the first aspect, in a sixth implementation of the first aspect, the optical fiber plug further includes a sub-assembly dust-proof cap, and an outer wall of the sub-assembly dust-proof cap is provided with a lock slot engaged with the lock block.

In this implementation, the sub-assembly dust-proof cap is configured to protect the optical fiber plug from water and dust before the optical fiber plug is inserted into the optical fiber adapter.

A structure of the lock slot of the sub-assembly dust-proof cap may be the same as that of the lock slot of the optical fiber adapter, so as to facilitate an interconnection between the sub-assembly dust-proof cap and the optical fiber plug.

With reference to any one of the first aspect, or the first implementation to the sixth implementation of the first aspect, in a seventh implementation of the first aspect, the optical fiber plug further includes a tail assembly, one end of the tail assembly is fixedly connected to an optical cable, the other end of the tail assembly abuts on one end of the lock cap, and an optical fiber extending from the optical cable enters the ferrule through the tail assembly.

In this implementation, the tail assembly is disposed to ensure conjunction and sealing effects obtained between the optical fiber plug and the optical cable.

With reference to the seventh implementation of the first aspect, in an eighth implementation of the first aspect, the optical fiber plug further includes a coupling shaft sheathed in the lock cap, the ferrule is disposed at one end of the coupling shaft, the end of the coupling shaft abuts on the sleeve, the other end of the coupling shaft is disposed in the tail assembly, and a channel through which the optical fiber passes is provided inside the coupling shaft.

In this implementation, the coupling shaft is disposed to ensure that after passing through the tail assembly, the optical fiber can reach the ferrule through the coupling shaft, so as to implement a connection between the tail assembly and the ferrule.

With reference to the seventh implementation of the first aspect, in a ninth implementation of the first aspect, the tail assembly includes a rubber heat shrinkable sleeve, a crimp ring, and a tail sheath; the crimp ring is sleeved on the other end of the coupling shaft, and the crimp ring is configured to tightly crimp a reinforcement member of the optical cable onto the coupling shaft; one end of the rubber heat shrinkable sleeve is wrapped on the optical cable, and the other end of the rubber heat shrinkable sleeve is wrapped on the other end of the coupling shaft and the crimp ring; and the tail sheath is sleeved on the coupling shaft and the rubber heat shrinkable sleeve, and one end of the tail sheath abuts on the other end of the lock cap.

In this implementation, the tail assembly includes the rubber heat shrinkable sleeve, the crimp ring, and the tail sheath. One end of the rubber heat shrinkable sleeve is wrapped on the optical cable, and the other end of the rubber heat shrinkable sleeve is wrapped on the crimp ring, so that the optical cable enters the coupling shaft through the inside of the rubber heat shrinkable sleeve. The rubber heat shrinkable sleeve is closely adhered to the coupling shaft and the optical cable in a heat shrinking manner, to ensure sealing and fastening effects of the tail assembly. Next, the reinforcement member of the optical cable is tightly crimped onto the coupling shaft by using the crimp ring to implement fastening. Finally, the tail sheath is sleeved on the rubber heat shrinkable sleeve to implement protection.

Further, the optical fiber plug further includes an elastic member. The elastic member is disposed between the coupling shaft and the lock cap. One end of the elastic member abuts on a shaft shoulder of one end at which the coupling shaft is connected to the ferrule, and the other end of the elastic member abuts on a shaft shoulder of an inner cavity of the lock cap. The shaft shoulder of the inner cavity of the lock cap is located at one end that is of the lock cap and that is close to the tail assembly. The lock cap may slide axially in a short distance along the coupling shaft in a limited manner. The elastic member is configured to provide the lock cap with an elastic force along a direction that is away from the ferrule, so as to implement a connecting and anti-loosening function.

The elastic member includes but is not limited to a spring.

Further, the optical fiber plug further includes several sealing rings. One of the several sealing rings is disposed between the coupling shaft and the lock cap. Another sealing ring of the several sealing rings is used together with the lock cap are used in pair, and is used between the sub-assembly dust-proof cap and the lock cap, or is used between the optical fiber adapter and the lock cap. The sealing ring is disposed to achieve a sealing effect at the foregoing location. When the sealing ring is used between the optical fiber adapter and the lock cap, a waterproof and dustproof sealing effect may be achieved for the optical fiber connector assembly.

The sealing ring may be preferably an O-shaped sealing ring, so as to match a shape of the foregoing structural member, to achieve a good sealing effect.

According to a second aspect, an embodiment of the present invention provides an optical fiber adapter, including a socket, where an end face of one end of the socket is provided with a cavity configured to accommodate a ferrule of an optical fiber plug, an outer wall of the socket is provided with at least one lock slot, and the lock slot is configured to be engaged and locked with a lock block on the optical fiber plug; and an opening of the lock slot is horn-shaped, and when the optical fiber plug and the optical fiber adapter are interconnected by circumferentially aligning the sleeve with the optical fiber adapter, the lock block can be led to a lock location on the lock slot from the horn-shaped opening of the lock slot.

In this embodiment of the present invention, the outer wall of the socket is provided with the at least one lock slot, so that the lock slot is engaged with the lock block on the optical fiber plug to implement locking. During specific locking, because the opening of the lock slot is horn-shaped, when the optical fiber plug and the optical fiber adapter are interconnected by circumferentially aligning the sleeve with the optical fiber adapter, the lock block can be led to the lock location on the lock slot from the horn-shaped opening of the lock slot, so that locking and fastening are completed. When the optical fiber adapter is connected to or detached from the optical fiber plug, there is no need to perform multiple circles of rotation like a threaded connection manner. Therefore, an operation is simple and less time-consuming.

The lock location on the lock slot is located at the bottom of the lock slot.

The outer wall of the socket is a cylindrical surface.

The lock slot includes a horizontal lock portion and a vertical chute portion (that is, the opening of the lock slot), the horizontal lock portion is disposed along a circumferential direction of the socket, and the vertical chute portion is disposed along an axial direction of the socket. The horizontal lock portion and the vertical chute portion are communicated with each other.

Preferably, an opening of the vertical chute portion is horn-shaped.

With reference to the second aspect, in a first implementation of the second aspect, the end face of the end of the socket is further provided with a ring-shaped slot, the slot is disposed around a periphery of the cavity, and a locating key engaged with an open slot of the optical fiber plug is disposed in the slot.

In this implementation, in this embodiment of the present invention, the socket includes the slot, and the locating key engaged with the open slot of the optical fiber plug is disposed in the slot, so as to locate the optical fiber plug and the optical fiber adapter and interconnect the optical fiber plug to the optical fiber adapter.

With reference to the second aspect or the first implementation of the second aspect, in a second implementation of the second aspect, the optical fiber adapter further includes an adapter dust-proof cap, and a lock block engaged with the lock slot is disposed on an outer wall of the adapter dust-proof cap.

A structure of the lock block of the optical fiber adapter dust-proof cap may be the same as that of the lock block of the optical fiber plug.

According to a third aspect, an embodiment of the present invention provides an optical fiber connector assembly, including the optical fiber plug according to the first aspect or the implementations thereof and the optical fiber adapter according to the second aspect or the implementations thereof.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

To facilitate understanding of the technical solutions provided in the embodiments of the present invention, an application scenario of the present invention is first described with reference to FIG. 1.

Figure 1:
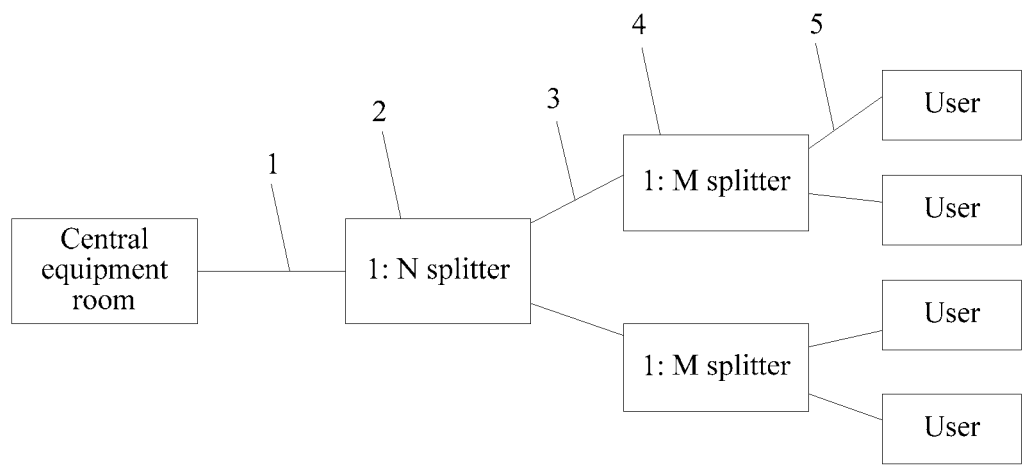
FIG. 1 is a diagram of an application scenario according to an embodiment of the present invention.

FIG. 1 is a part of an FTTx optical network. An FTTx may be an FTTH (English: Fiber To The Home), or may be an FTTC (English: Fiber to the Curbe), or may be an FTTP (English: Fiber To The Premises), or may be an FTTN (English: Fiber To The Node or Neighborhood), or may be an FTTO (English: Fiber To The Office), or may be an FTTSA (English: Fiber To The Service area). An FTTH network is used as an example. In a downstream direction starting from a central equipment room, the FTTH includes a feeder link 1, a 1:N splitter 2, a distribution link 3, a 1:M splitter 4, and at least one branch link 5. N and M are both positive integers. In this embodiment of the present invention, an optical fiber connector assembly is applicable to connect optical fibers in the branch link 5. In addition, although a type of network using an FTTx structure is used as an example in the present invention, in another network structure, the optical fiber connector assembly provided in this embodiment of the present invention may also be configured to connect optical fibers.

Figure 2:
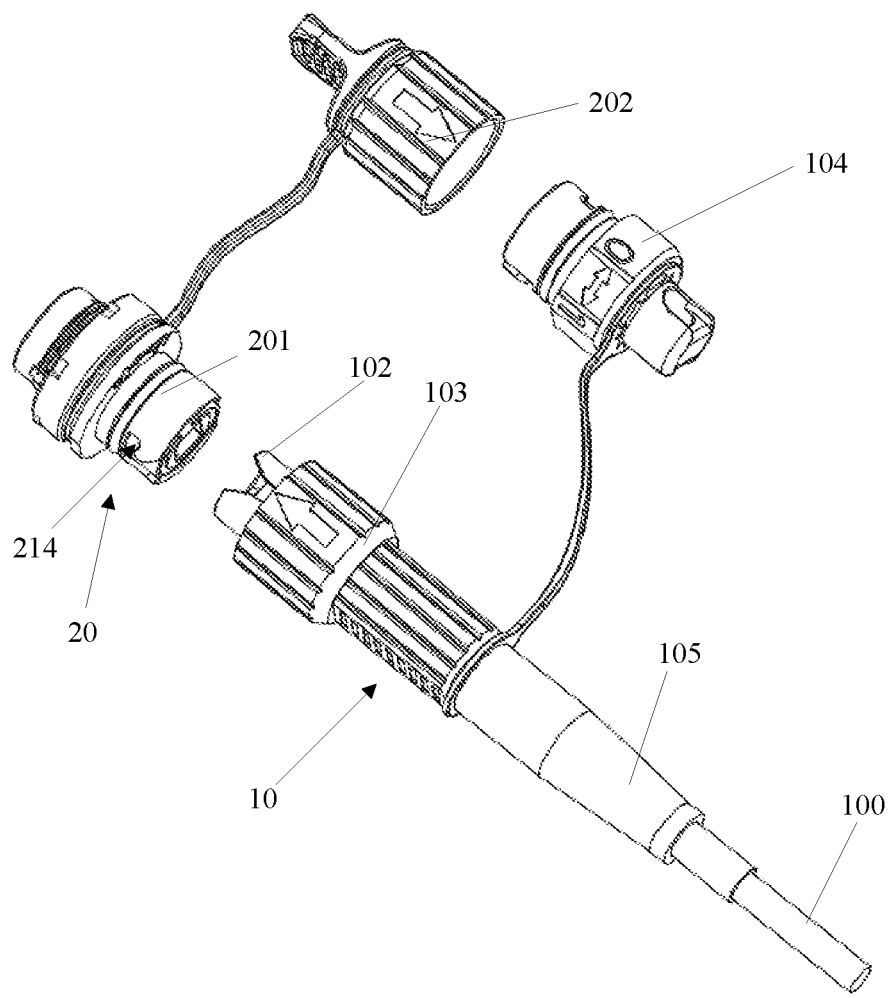
FIG. 2 is a schematic structural diagram of an optical fiber connector assembly according to an embodiment of the present invention.

FIG. 2 is a schematic structural diagram of an optical fiber connector assembly according to an embodiment of the present invention. Referring to FIG. 2, the optical fiber connector assembly includes an optical fiber plug 10 and an optical fiber adapter 20. The optical fiber plug 10 is connected to the optical fiber adapter 20, so that optical fibers inside both the optical fiber adapter 20 and the optical fiber plug 10 are interconnected.

Figure 3:
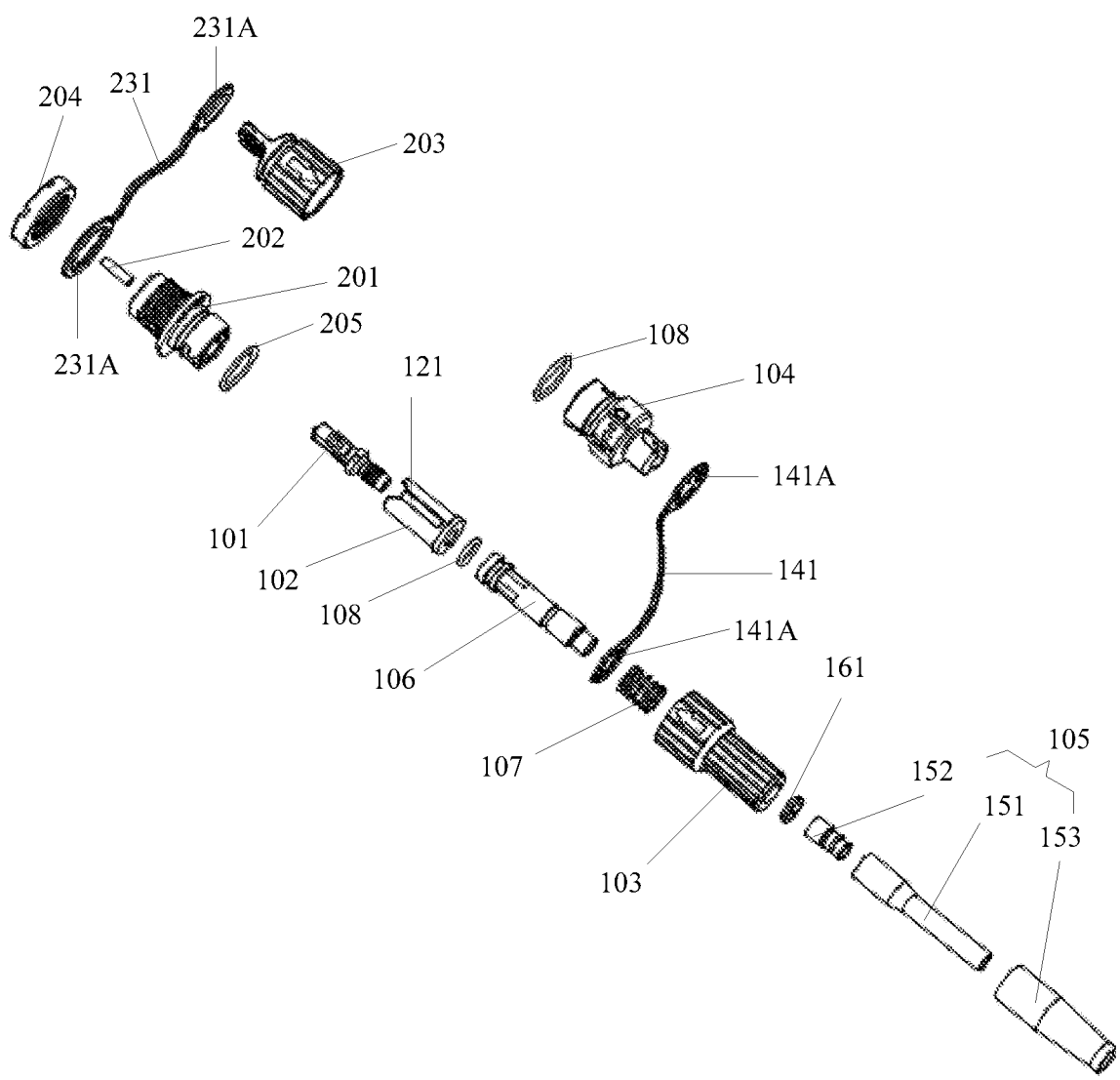
FIG. 3 is a schematic exploded structural diagram of an optical fiber connector assembly according to an embodiment of the present invention.
Figure 4:
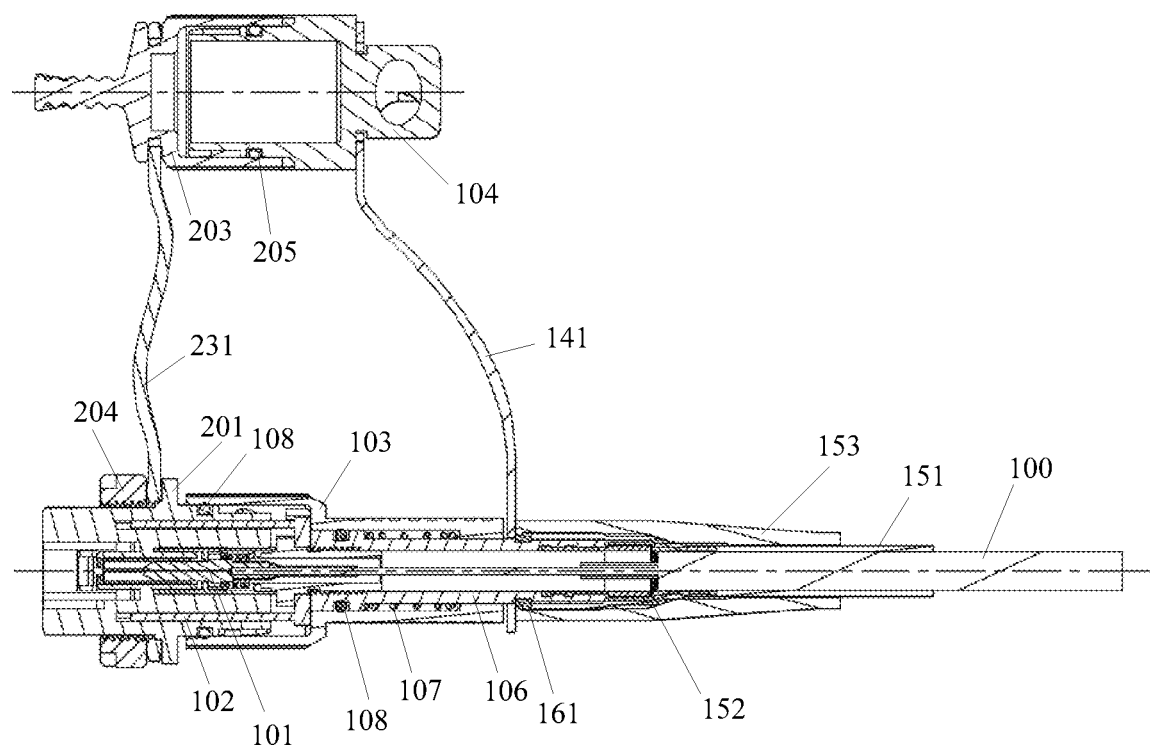
FIG. 4 is a schematic cross-sectional diagram of an optical fiber connector assembly according to an embodiment of the present invention.

FIG. 3 is a schematic exploded structural diagram of the optical fiber connector assembly provided in FIG. 2. FIG. 4 is a schematic cross-sectional diagram of the optical fiber connector assembly provided in FIG. 2 after the optical fibers inside both the optical fiber adapter and the optical fiber plug are interconnected.

Referring to FIG. 2 to FIG. 4, the optical fiber plug 10 includes a ferrule 101 sleeved on an optical fiber, a sleeve 102 sleeved on the outside of the ferrule 101, and a lock cap 103 rotatably sleeved on the sleeve 102.

Figure 5:
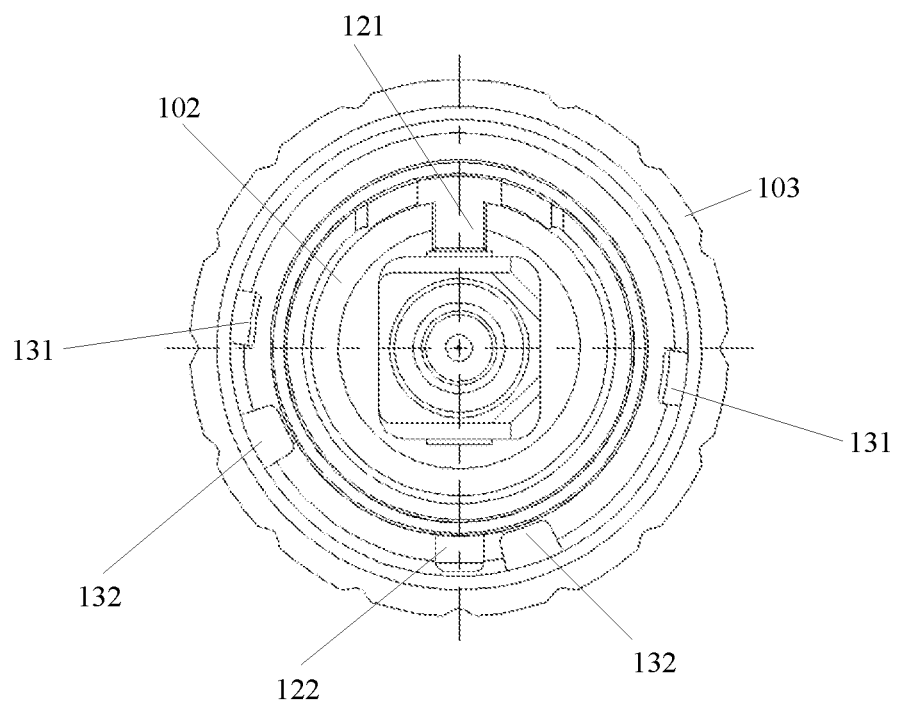
FIG. 5 is a schematic diagram of an end face of an optical fiber plug according to an embodiment of the present invention.

FIG. 5 is a schematic diagram of an end face of the optical fiber plug 10 according to an embodiment of the present invention. Referring to FIG. 5, at least one lock block 131 is disposed on an inner wall of the lock cap 103, and the lock block 131 is configured to be engaged and locked with a lock slot 214 (referring to FIG. 2) on the optical fiber adapter 20.

Two stop blocks 132 are further disposed on the inner wall of the lock cap 103. The two stop blocks 132 are arranged at intervals along a circumferential direction of the lock cap 103. A stop rod 122 is disposed on an outer wall of the sleeve 102, and the stop rod 122 is located between the two stop blocks 132, so that the lock cap 103 rotates relative to the sleeve 102 within an angle range limited by the two stop blocks 132. When the optical fiber plug 10 and the optical fiber adapter 20 are interconnected by circumferentially aligning the sleeve 102 with the optical fiber adapter 20, the lock block 131 can be led to a lock location on the lock slot 214 from a horn-shaped opening of the lock slot 214 if the lock cap 103 rotates relative to the sleeve 102 to any location. That is, when the lock cap 103 stays relative to the sleeve 102 at any location within the angle range limited by the two stop blocks 132, the lock block 131 can be led to the lock location on the lock slot 214.

Figure 6:
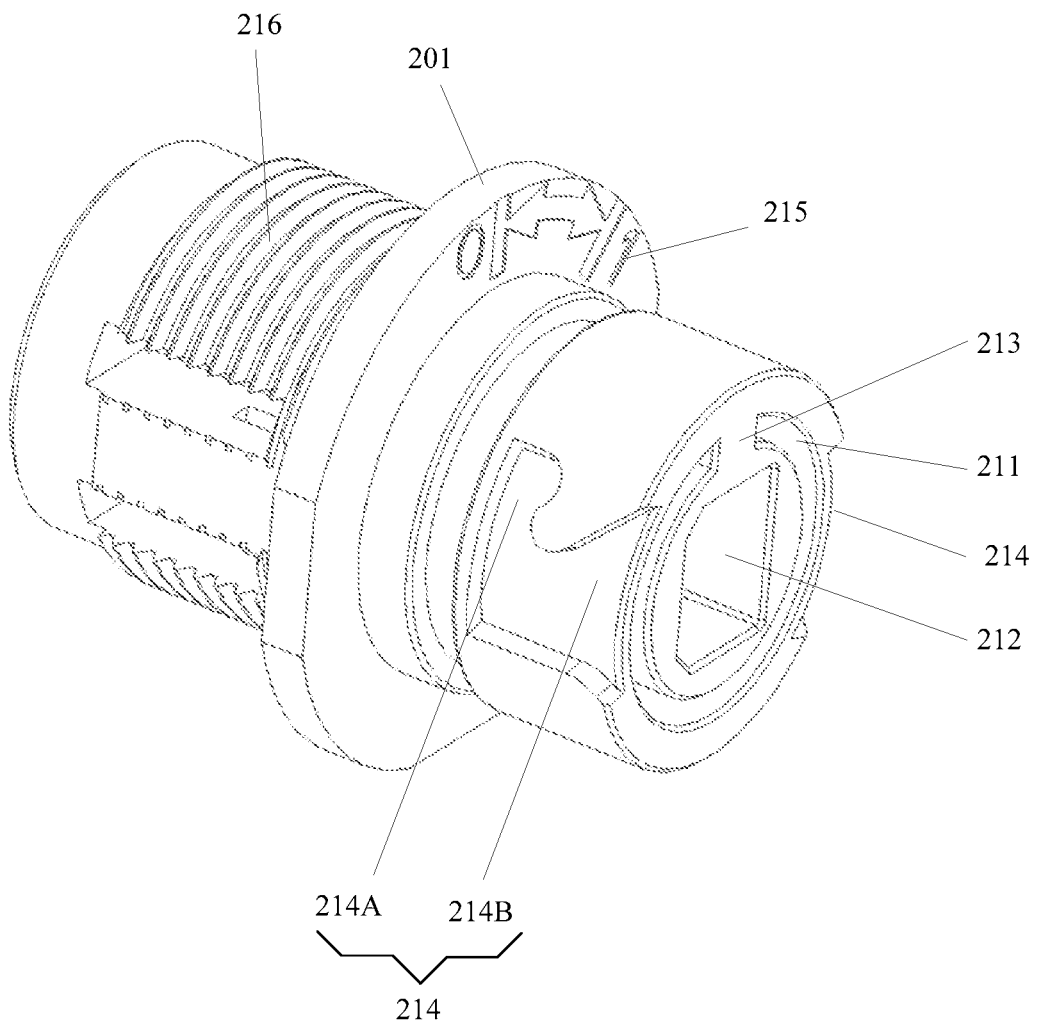
FIG. 6 is a schematic structural diagram of a socket according to an embodiment of the present invention.

Referring to FIG. 2 to FIG. 4, the optical fiber adapter 20 includes a socket 201. FIG. 6 is a schematic structural diagram of the socket 201 according to an embodiment of the present invention. Referring to FIG. 6, an end face of one end of the socket 201 is provided with a cavity 212 configured to accommodate the ferrule 101 of the optical fiber plug 10. The cavity 212 is configured to be engaged with and interconnected to the ferrule 101 of the optical fiber plug 10. An outer wall of the socket 201 is provided with at least one lock slot 214, and the lock slot 214 is configured to be engaged and locked with the lock block 131 on the optical fiber plug 10.

An opening of the lock slot 214 is horn-shaped. When the optical fiber plug 10 and the optical fiber adapter 20 are interconnected by circumferentially aligning the sleeve 102 with the optical fiber adapter 20, the lock block 131 can be led to the lock location on the lock slot 214 from the horn-shaped opening of the lock slot 214 if the lock cap 103 rotates relative to the sleeve 102 to any location.

In this embodiment of the present invention, the optical fiber is sheathed in the ferrule. During optical fiber connection, the optical fiber plug and the optical fiber adapter are interconnected, so that the optical fiber can be interconnected to an optical fiber of an optical fiber plug (a common optical fiber plug, such as the optical fiber plug in the threaded connection manner described in the background) connected to another side of the optical fiber adapter. The sleeve is disposed on the outside of the ferrule of the optical fiber plug, the lock cap is limitedly rotatably sleeved on the outside of the sleeve, and the lock block is disposed on the inner wall of the lock cap, so that the lock block is engaged and locked with the lock slot on the optical fiber adapter. During specific locking, because the two stop blocks matching the stop rod on the outer wall of the sleeve are further disposed on the inner wall of the lock cap, the lock cap rotates relative to the sleeve within the angle range limited by the two stop blocks. When the optical fiber plug and the optical fiber adapter are interconnected by circumferentially aligning the sleeve with the optical fiber adapter, the lock block can be led to the lock location on the lock slot from the horn-shaped opening of the lock slot if the lock cap rotates relative to the sleeve to any location. That is, provided that the ferrule and the sleeve of the optical fiber plug are interconnected to the optical fiber adapter, the lock block of the lock cap can be led to the lock location of the lock slot of the socket, so that locking and fastening are completed. When the optical fiber plug is connected to or detached from the optical fiber adapter, there is no need to perform multiple circles of rotation like the threaded connection manner. Therefore, an operation is simple and less time-consuming.

During implementation, the end face of the socket 201 may be a circle. A radian corresponding to the horn-shaped opening is greater than or equal to the foregoing angle range, so that the lock block can be inserted into the horn-shaped opening at any angle. The radian corresponding to the horn-shaped opening is a radian of an arc formed by the horn-shaped opening on the end face of the socket 201.

Referring to FIG. 5, the angle range limited by the two stop blocks 132 may be from 30 degrees to 90 degrees. That is, the lock cap 103 may rotate around the sleeve 102 within an angle range from 30 degrees to 90 degrees. Correspondingly, the radian corresponding to the opening of the lock slot 214 of the optical fiber adapter 20 may also be set to 30 degrees to 90 degrees. The angle range limited by the two stop blocks 132 is set to 30 degrees to 90 degrees. Therefore, on the one hand, a rotatable range of the lock cap 103 is not excessively large and a rotation amplitude of the lock cap 103 during locking is reduced, to facilitate an operation. On the other hand, the rotatable range of the lock cap is not excessively small, to ensure a locking effect obtained between the optical fiber plug 10 and the optical fiber adapter 20.

Preferably, the angle range limited by the two stop blocks 132 is 45 degrees.

Referring to FIG. 5, two lock blocks 131 are disposed on the inner wall of the lock cap 103, and an angle between the two lock blocks 131 is 180 degrees. Correspondingly, an outer wall of the optical fiber adapter 20 is provided with two lock slots 214 (referring to FIG. 6), and the two lock slots 214 are symmetrically disposed on two sides of the outer wall of the optical fiber adapter 20. The locking effect obtained between the optical fiber plug and the optical fiber adapter may be reinforced by disposing the two symmetrically distributed lock blocks.

As shown in FIG. 2, at least a part of the sleeve 102 protrudes from one end of the lock cap 103. An end that is of the sleeve 102 and protrudes from the lock cap 103 is provided with an open slot 121, and the open slot 121 axially extends from an end portion of the sleeve 102. Correspondingly, the end face of one end of the socket 201 is provided with a ring-shaped slot 211. The slot 211 is disposed around a periphery of the cavity 212 and extends along an axial direction of the socket 201. The slot 211 is configured to be engaged with and interconnected to the sleeve 102 of the optical fiber plug 10. A locating key 213 (referring to FIG. 6) engaged with the open slot 121 is disposed in the slot 211. In this embodiment of the present invention, circumferential alignment between the sleeve and optical fiber adapter may be alignment between the open slot 121 of the sleeve 102 and the locating key 213 of the slot 211. At least a part of the sleeve protrudes from one end of the lock cap, so that the sleeve can be conveniently circumferentially aligned with the optical fiber adapter, so as to facilitate the interconnection between the optical fiber plug and the optical fiber adapter. After the interconnection is completed, the locating key of the slot is inserted into the open slot of the sleeve, so that circumferential locating of the optical fiber plug and the optical fiber adapter is implemented.

Figure 7:
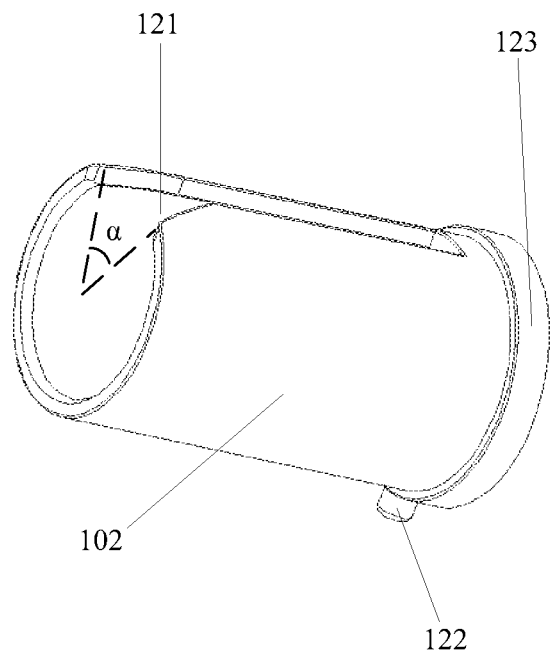
FIG. 7 is a schematic structural diagram of a sleeve according to an embodiment of the present invention.

FIG. 7 is a schematic structural diagram of the sleeve according to an embodiment of the present invention. Referring to FIG. 7, an opening of the open slot 121 of the lock cap 103 may be horn-shaped, so that it is convenient to interconnect the optical fiber plug to the optical fiber adapter. An angle α of the horn-shaped opening may be 10 degrees to 30 degrees.

In this embodiment of the present invention, the lock slot 214 includes a horizontal lock portion 214A (corresponding to the foregoing lock location) and a vertical chute portion 214B (corresponding to the opening of the foregoing lock slot 214). The horizontal lock portion 214A is disposed along a circumferential direction of the socket 201. The vertical chute portion 214B is disposed along an axial direction of the socket 201. The horizontal lock portion 214A and the vertical chute portion 214B are communicated with each other. An opening of the vertical chute portion 214B is horn-shaped, that is, the foregoing horn-shaped opening. After sliding in from the vertical chute portion 214B, the lock block 131 enters the horizontal lock portion 214A. The lock block 131 is rotated to the lock location (a location that is in the horizontal lock portion 214A and is away from the vertical chute portion 214B) on the horizontal lock portion 214A by rotating the lock cap 103.

The sleeve 102 is a cylinder sleeve-shaped object. Certainly, FIG. 7 merely shows an example. The sleeve 102 may alternatively be another sleeve-shaped object such as an elliptic cylinder sleeve-shaped object.

As shown in FIG. 7, one end of the sleeve 102 is provided with an outward flange 123. The stop rod 122 is disposed on an outer wall of the outward flange 123. A shape of the stop rod 122 includes but is not limited to a cylinder. The other end of the sleeve 102 is provided with the open slot 121. When the sleeve 12 is seen along an axial direction of the sleeve 102 from the end of the sleeve 102 that is provided with the open slot 121, the sleeve 102 is C-shaped. In addition, the open slot 121 axially extends to a location near the outward flange 123. Therefore, on the one hand, the sufficiently long open slot 121 is disposed to ensure that the optical fiber plug is fully interconnected to the optical fiber adapter. On the other hand, the open slot 121 is not allowed to pass through the entire sleeve 102, so that the bottom of the sleeve 102 can restrict a location of the ferrule 101.

Referring to FIG. 2 to FIG. 4 again, the optical fiber plug 10 may further include a sub-assembly dust-proof cap 104. The sub-assembly dust-proof cap 104 is configured to protect the optical fiber plug 10 from water and dust before the optical fiber plug 10 is inserted into the optical fiber adapter 20. A lock slot engaged with the lock block 131 is disposed on an outer wall of the sub-assembly dust-proof cap 104, so as to implement an interconnection to the optical fiber plug 10. A structure of the lock slot of the sub-assembly dust-proof cap 104 may be the same as that of the lock slot of the optical fiber adapter 20.

Referring to FIGS. 3 and 4, the sub-assembly dust-proof cap 104 is tied to the optical fiber plug 10 by using a first rope 141. A connection ring 141A is designed on each of two ends of the first rope 141. One connection ring 141A is sleeved on the sub-assembly dust-proof cap 104, and the other connection ring 141A is sleeved on the optical fiber plug 10.

Referring to FIG. 2 to FIG. 4 again, the optical fiber plug 10 may further include a tail assembly 105. One end of the tail assembly 105 is fixedly connected to an optical cable 100, and the other end of the tail assembly 105 abuts on one end of the lock cap 103. An optical fiber extending from the optical cable 100 enters the ferrule 101 through the tail assembly 105.

Referring to FIG. 2 to FIG. 4 again, the optical fiber plug 10 may further include a coupling shaft 106 sheathed in the lock cap 103. The ferrule 101 is disposed on one end of the coupling shaft 106, and the end of the coupling shaft 106 abuts on the sleeve 102. The other end of the coupling shaft 106 is disposed in the tail assembly 105. A channel through which the optical fiber passes is disposed inside the coupling shaft 106.

In this embodiment of the present invention, the ferrule 101 may be of various common ferrule types. The ferrule type includes but is not limited to an SC (English: Square Connector), an LC (English: Lucent Connector), an FC (English: Ferrule Connector), and an MPO (English: Multi-fiber Push On). A front end (one end connected to the optical fiber adapter 20) of the ferrule 101 is located inside the sleeve 102. The end that is of the sleeve 102 and protrudes from the lock cap 103 protrudes from an end face of the ferrule 101. At the front end of the ferrule 101, there is usually a ceramic ferrule pin. The protruding sleeve 102 is disposed to prevent the ceramic ferrule pin of the ferrule 101 from being polluted when the optical fiber plug 10 is inserted or removed, or to protect the ceramic ferrule pin of the ferrule 101 during an accidental falling.

A rear end (the other end that is opposite to the front end) of the ferrule 101 is provided with an external thread. The end of the ferrule 101 that is provided with the external thread passes through the bottom of the sleeve 102, so that the rear end of the ferrule 101 that is provided with the external thread is connected to a front end that is of the coupling shaft 106 and that is provided with an internal thread. When the optical fiber plug 10 is connected to the optical fiber adapter 20, the front end that is of the ferrule 101 and that is provided with the ceramic ferrule pin is inserted into the cavity 212.

During implementation, the coupling shaft 106 may be a circular tube structure whose outer wall is provided with steps, the front end of the coupling shaft 106 is provided with the internal thread, and the coupling shaft 106 is connected to the ferrule 101 by using the thread.

During implementation, the tail assembly 105 may include a rubber heat shrinkable sleeve 151, a crimp ring 152, and a tail sheath 153. The crimp ring 152 is sleeved on the other end (a rear end, that is, the other end opposite to a front end) of the coupling shaft 106, and the crimp ring 152 is configured to tightly crimp a reinforcement member of the optical cable 100 onto the coupling shaft 106. One end of the rubber heat shrinkable sleeve 151 is wrapped on the optical cable 100, and the other end of the rubber heat shrinkable sleeve 151 is wrapped on the other end of the coupling shaft and the crimp ring 152. The tail sheath 153 is sleeved on the coupling shaft 106 and the rubber heat shrinkable sleeve 151, and one end of the tail sheath 153 abuts on the other end of the lock cap 103.

In this implementation, the reinforcement member (such as aramid) of the optical cable is crimped and fastened to the coupling shaft 106 by using the crimp ring 152 in a mechanical crimping manner.

In this implementation, the rubber heat shrinkable sleeve 151 is closely adhered to the coupling shaft 106 and the optical cable 100 in a heat shrinking manner, to ensure sealing and fastening effects of the tail assembly 105.

The tail sheath 153 may include a cylindrical tube and a conical tube. One end of the cylindrical tube is connected to one end of the conical tube, the other end of the cylindrical tube is sleeved on the coupling shaft 106, and the other end of the conical tube is sleeved on the rubber heat shrinkable sleeve 151.

During implementation, the other end of the coupling shaft 106 may be provided with at least two steps. A tail end is a first step, and a step near the first step is a second step. One end of the crimp ring 152 is connected to the first step of the coupling shaft 106. Specifically, the other end of the crimp ring 152 may be sleeved on the first step, and a connection manner includes but is not limited to a threaded connection and a clamp connection. The tail sheath 153 is sleeved on the second step of the coupling shaft 106.

Further, the other connection ring 141A of the first rope 141 of the sub-assembly dust-proof cap 104 may be sleeved on the second step. To avoid sliding of the first rope 141, a snap ring 161 may be disposed on the second step, so as to locate the first rope 141.

Figure 8:
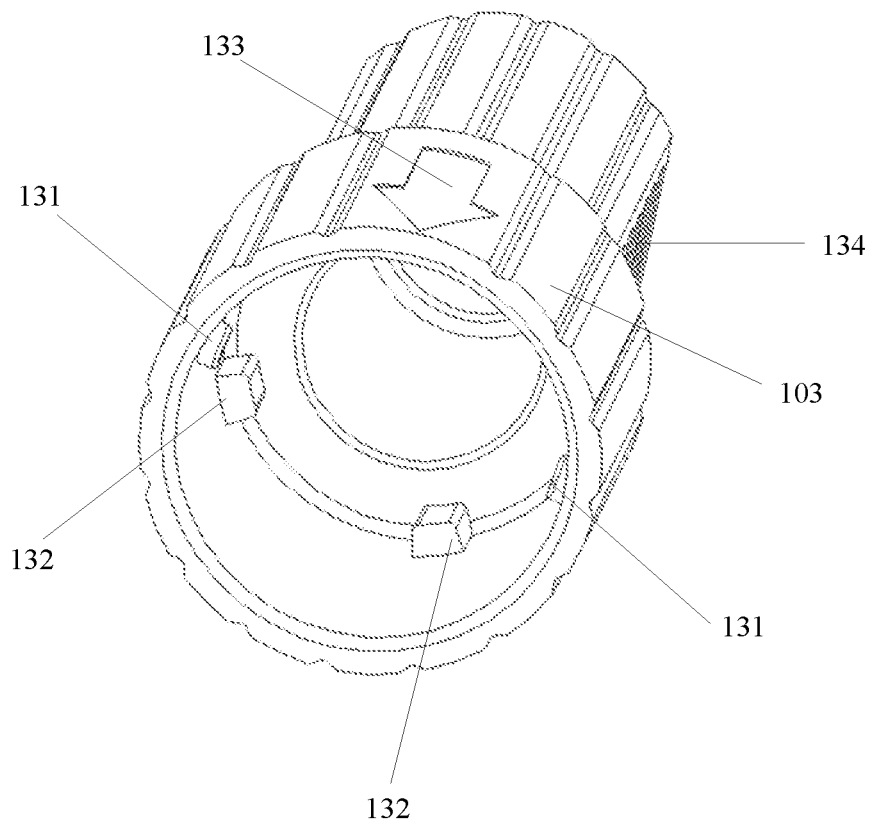
FIG. 8 is a schematic structural diagram of a lock cap according to an embodiment of the present invention.

FIG. 8 is a schematic structural diagram of the lock cap according to an embodiment of the present invention. Referring to FIG. 8, the lock cap 103 may include multiple circular tube structures having different diameters. For example, the lock cap 103 shown in FIG. 8 may include a large-diameter circular tube and a small-diameter circular tube. The large-diameter circular tube is sleeved on the sleeve 102, and the small-diameter circular tube is sleeved on the coupling shaft 106.

As shown in FIG. 8, a shape of the stop block 132 is a truncated pyramid, and a shape of the lock block 131 is a cylinder. Certainly, in this embodiment of the present invention, the shape of the lock block 131 and the shape of the stop block 132 are not limited thereto. For example, the shape of the lock block 131 and the shape of the stop block 132 may alternatively be a cuboid, a truncated cone, or the like.

A front end (one end that is connected to the optical fiber adapter 20) of the lock cap 103 is provided with an arrow alignment identifier 133, to indicate that the optical fiber connector assembly is connected or locked. Correspondingly, the optical fiber adapter 20 is provided with an indication identifier 215 (referring to FIG. 6) for identifying a connected state or a locked state. The indication identifier 215 includes but is not limited to a text (for example, 0 and 1, where 1 identifies the connected state, and 0 identifies the locked state), a symbol, and an arrow. As shown in FIG. 6, in this embodiment, 0, 1, and a two-headed arrow (indicating a rotation range) disposed between 0 and 1 are used as the foregoing indication identifier 215.

Further, an outer wall of the lock cap 103 is provided with a first groove axially extending along the lock cap 103. The groove design can increase friction on the outer wall when the lock cap 103 rotates, so as to facilitate rotation of the lock cap 103. The lock cap 103 is provided with an edge-cut plane 134, and a second groove perpendicular to an axis of the lock cap 103 is provided within the edge-cut plane 134. The second groove is disposed to improve operation hand-feel during insertion or removal of the optical fiber plug.

Preferably, the edge-cut plane 134 is disposed at a rear end (an end near a tail tube) of the lock cap 103. In addition, the lock cap 103 includes two symmetrically disposed edge-cut planes 134.

Referring to FIG. 2 to FIG. 4 again, the optical fiber plug 10 may further include an elastic member 107. The elastic member 107 is disposed between the coupling shaft 106 and the lock cap 103. One end of the elastic member 107 abuts on a shaft shoulder of one end at which the coupling shaft 106 is connected to the ferrule 101, and the other end of the elastic member 107 abuts on a shaft shoulder of an inner cavity of the lock cap 103. The shaft shoulder of the inner cavity of the lock cap 103 is located at one end that is of the lock cap 103 and that is close to the tail assembly 105. The lock cap 103 may axially slide within a short distance along the coupling shaft 106 in a limited manner. The elastic member 107 is configured to provide the lock cap 103 with an elastic force along a direction that is away from the ferrule 101, so as to implement a connecting and anti-loosening function.

The elastic member 107 includes but is not limited to a spring.

Referring to FIG. 2 to FIG. 4 again, the optical fiber plug 10 may further include several sealing rings 108. One of the several sealing rings 108 is disposed between the coupling shaft 106 and the lock cap 103. Another sealing ring 108 of the several sealing rings 108 is used together with the lock cap 103, and is used between the sub-assembly dust-proof cap 104 and the lock cap 103, or is used between the optical fiber adapter 20 and the lock cap 103. The sealing ring 108 is disposed to achieve a sealing effect at the foregoing location. When the sealing ring 108 is used between the optical fiber adapter 20 and the lock cap 103, an IP68 sealing effect may be achieved for the optical fiber connector assembly.

The sealing ring 108 may be an O-shaped sealing ring, so as to match a shape of the foregoing structural member, to achieve a good sealing effect.

Referring to FIG. 2 to FIG. 4 and FIG. 6 again, besides the socket 201, the optical fiber adapter 20 further includes a ceramic tube 202, an adapter dust-proof cap 203, a locking nut 204, and a sealing ring 205.

The ceramic tube 202 is disposed at a center of the socket 201 of the optical fiber adapter 20.

Further, to facilitate an optical fiber interconnection, two ends of the socket 201 are provided with openings of ferrules of corresponding optical fiber sub-assemblies, and the ceramic tube 202 is disposed in the opening and is configured to connect optical fibers in the ferrules of the two optical fiber sub-assemblies inserted from the two ends of the socket 201.

Referring to FIG. 2 to FIG. 4 and FIG. 6 again, the optical fiber adapter 20 may further include the adapter dust-proof cap 203, and the adapter dust-proof cap 203 is configured to protect the optical fiber plug 20 from water and dust before the optical fiber plug 20 is connected to the optical fiber plug 10. An outer wall of the adapter dust-proof cap 203 is provided with a lock block that is the same as that of the optical fiber plug 10, so as to implement an interconnection to the optical fiber adapter 20. When the optical fiber adapter 20 is connected to the optical fiber plug 10, the adapter dust-proof cap 203 may be connected to the sub-assembly dust-proof cap 104 (referring to FIG. 8).

The adapter dust-proof cap 203 is tied to the socket 201 by using a second rope 231. A connection ring 231A is designed at each of two ends of the second rope 231. One connection ring 231A is sleeved on the adapter dust-proof cap 203, and the other connection ring 231A is sleeved on the socket 201.

During implementation, the outer wall of the socket 201 may be a circular tube structure whose external contour is step-shaped. Specifically, the external contour of the socket 201 may be a flange with a protrusion in the middle. One side of the socket 201 is configured to interconnect to the optical fiber plug 10, and the other side of the socket 201 is used for insertion of and interconnection with another optical fiber plug (which is usually a common optical fiber plug) matching the socket 201.

Further, the outer wall of the adapter dust-proof cap 203 is provided with an arrow alignment identifier the same as that of the lock cap of the optical fiber plug 10.

Referring to FIG. 2 to FIG. 4 and FIG. 6 again, the optical fiber adapter 20 may further include the locking nut 204, and the locking nut 204 is configured to fasten the entire the optical fiber adapter 20 onto a corresponding mounting kit case. Specifically, after passing through a mounting hole on the mounting kit case, the optical fiber adapter 20 is locked and fastened by using the locking nut 204.

Referring to FIG. 2 to FIG. 4 and FIG. 6 again, the optical fiber adapter 20 may further include the sealing ring 205. The sealing ring 205 is sleeved on a protruding side and is used between the adapter dust-proof cap 203 and the optical fiber adapter 20. The sealing ring 205 may be disposed to achieve a sealing effect at the foregoing location. When the adapter dust-proof cap 203 is connected to the sub-assembly dust-proof cap 104, the sealing ring 205 is located between the adapter dust-proof cap 203 and the sub-assembly dust-proof cap 104.

The sealing ring 205 may be an O-shaped sealing ring, so as to match a shape of the foregoing structural member, to achieve a good sealing effect.

The foregoing descriptions are merely example embodiments of the present invention, but are not intended to limit the present invention. Any modification, equivalent replacement, and improvement made without departing from the spirit and principle of the present invention shall fall within the protection scope of the present invention.

What is claimed is:

1. An optical fiber plug, wherein the optical fiber plug comprises a ferrule, a sleeve sleeved on the outside of the ferrule, and a lock cap rotatably sleeved on the sleeve, wherein at least one lock block is disposed on an inner wall of the lock cap, and wherein the at least one lock block is configured to be engaged and locked with a lock slot on an optical fiber adapter;

wherein two stop blocks are disposed on the inner wall of the lock cap, wherein the two stop blocks are arranged at intervals along a circumferential direction of the lock cap, wherein a stop rod is disposed on an outer wall of the sleeve, wherein the stop rod is located between the two stop blocks, wherein the lock cap rotates relative to the sleeve within an angle range limited by the two stop blocks, and wherein the angle range limited by the two stop blocks is from 30 degrees to 90 degrees; and wherein when the optical fiber plug and the optical fiber adapter are interconnected by circumferentially aligning the sleeve with the optical fiber adapter, the at least one lock block can be led to a lock location on the lock slot from a horn-shaped opening of the lock slot if the lock cap rotates relative to the sleeve to any location, and wherein a radian corresponding to the horn-shaped opening is greater than or equal to the angle range limited by the two stop blocks.

2. The optical fiber plug according to claim 1, wherein two lock blocks are disposed on the inner wall of the lock cap, and wherein a relative circumferential angle between the two lock blocks is 180 degrees.

3. The optical fiber plug according to claim 1, wherein at least a part of the sleeve protrudes from one end of the lock cap, wherein an end that is of the sleeve and protrudes from the lock cap is provided with an open slot engaged with a locating key of the optical fiber adapter, and wherein the open slot axially extends from an end portion of the sleeve.

4. The optical fiber plug according to claim 3, wherein an opening of the open slot of the sleeve is horn-shaped.

5. The optical fiber plug according to claim 3, wherein the end that is of the sleeve and protrudes from the lock cap protrudes from an end face of the ferrule.

6. The optical fiber plug according to claim 1, wherein the optical fiber plug further comprises a sub-assembly dust-proof cap, and wherein an outer wall of the sub-assembly dust-proof cap is provided with a lock slot engaged with the at least one lock block.

7. The optical fiber plug according to claim 1, wherein the optical fiber plug further comprises a tail assembly, wherein one end of the tail assembly is fixedly connected to an optical cable, wherein the other end of the tail assembly abuts on one end of the lock cap, and wherein an optical fiber extending from the optical cable enters the ferrule through the tail assembly.

8. The optical fiber plug according to claim 7, wherein the optical fiber plug further comprises a coupling shaft sheathed in the lock cap, wherein the ferrule is disposed at one end of the coupling shaft, wherein the end of the coupling shaft abuts on the sleeve, wherein the other end of the coupling shaft is disposed in the tail assembly, and wherein a channel through which the optical fiber passes is provided inside the coupling shaft.

9. The optical fiber plug according to claim 8, wherein the tail assembly comprises a rubber heat shrinkable sleeve, a crimp ring, and a tail sheath;

wherein the crimp ring is sleeved on the other end of the coupling shaft, and wherein the crimp ring is configured to tightly crimp a reinforcement member of the optical cable onto the coupling shaft;

wherein one end of the rubber heat shrinkable sleeve is wrapped on the optical cable, and wherein the other end of the rubber heat shrinkable sleeve is wrapped on the other end of the coupling shaft and the crimp ring; and wherein the tail sheath is sleeved on the coupling shaft and the rubber heat shrinkable sleeve, and wherein one end of the tail sheath abuts on the other end of the lock cap.

10. An optical fiber adapter, comprising a socket, wherein an end face of one end of the socket is provided with a cavity configured to accommodate a ferrule of an optical fiber plug, wherein an outer wall of the socket is provided with at least one lock slot, and wherein the at least one lock slot is configured to be engaged and locked with a lock block on the optical fiber plug; and wherein an opening of the at least one lock slot is horn-shaped, wherein a radian corresponding to the horn-shaped opening is greater than or equal to an angle range limited by two stop blocks on the optical fiber plug, and wherein when the optical fiber plug and the optical fiber adapter are interconnected by circumferentially aligning a sleeve of the optical fiber plug with the optical fiber adapter, the lock block can be led to a lock location on the at least one lock slot from the horn-shaped opening of the at least one lock slot.

11. The optical fiber adapter according to claim 10, wherein the end face of the end of the socket is further provided with a ring-shaped slot, wherein the slot is disposed around a periphery of the cavity, and wherein a locating key engaged with an open slot of the optical fiber plug is disposed in the slot.

12. The optical fiber adapter according to claim 10, wherein the optical fiber adapter further comprises an adapter dust-proof cap, and wherein a lock block engaged with the at least one lock slot is disposed on an outer wall of the adapter dust-proof cap.

13. An optical fiber connector assembly, wherein the optical fiber connector assembly comprises an optical fiber plug and an optical fiber adapter;

wherein the optical fiber plug comprises a ferrule, a sleeve sleeved on the outside of the ferrule, and a lock cap rotatably sleeved on the sleeve, wherein at least one lock block is disposed on an inner wall of the lock cap, and wherein the at least one lock block is configured to be engaged and locked with a lock slot on the optical fiber adapter;

wherein two stop blocks are disposed on the inner wall of the lock cap, wherein the two stop blocks are arranged at intervals along a circumferential direction of the lock cap, wherein a stop rod is disposed on an outer wall of the sleeve, wherein the stop rod is located between the two stop blocks, wherein the lock cap rotates relative to the sleeve within an angle range limited by the two stop blocks, and wherein the angle range limited by the two stop blocks is from 30 degrees to 90 degrees;

wherein when the optical fiber plug and the optical fiber adapter are interconnected by circumferentially aligning the sleeve with the optical fiber adapter, the at least one lock block can be led to a lock location on the lock slot from a horn-shaped opening of the lock slot if the lock cap rotates relative to the sleeve to any location, and wherein a radian corresponding to the horn-shaped opening is greater than or equal to the angle range limited by the two stop blocks;

wherein the optical fiber adapter comprises a socket, wherein an end face of one end of the socket is provided with a cavity configured to accommodate the ferrule of the optical fiber plug, wherein an outer wall of the socket is provided with at least one lock slot, and wherein the lock slot is configured to be engaged and locked with the at least one lock block on the optical fiber plug; and wherein an opening of the lock slot is horn-shaped, and wherein when the optical fiber plug and the optical fiber adapter are interconnected by circumferentially aligning the sleeve of the optical fiber plug with the optical fiber adapter, the at least one lock block can be led to a lock location on the lock slot from the horn-shaped opening of the lock slot.

14. The optical fiber connector assembly according to claim 13, wherein at least a part of the sleeve protrudes from one end of the lock cap, wherein an end that is of the sleeve and protrudes from the lock cap is provided with an open slot engaged with a locating key of the optical fiber adapter, and wherein the open slot axially extends from an end portion of the sleeve.

15. The optical fiber connector assembly according to claim 14, wherein the end that is of the sleeve and protrudes from the lock cap protrudes from an end face of the ferrule.

16. The optical fiber connector assembly according to claim 13, wherein the optical fiber plug further comprises a sub-assembly dust-proof cap, and wherein an outer wall of the sub-assembly dust-proof cap is provided with a lock slot engaged with the at least one lock block.

17. The optical fiber connector assembly according to claim 13, wherein the optical fiber plug further comprises a tail assembly, wherein one end of the tail assembly is fixedly connected to an optical cable, wherein the other end of the tail assembly abuts on one end of the lock cap, and wherein an optical fiber extending from the optical cable enters the ferrule through the tail assembly.

18. The optical fiber connector assembly according to claim 13, wherein the end face of the end of the socket is further provided with a ring-shaped slot, wherein the slot is disposed around a periphery of the cavity, and wherein a locating key engaged with an open slot of the optical fiber plug is disposed in the slot.

19. The optical fiber connector assembly according to claim 13, wherein the optical fiber adapter further comprises an adapter dust-proof cap, and wherein a lock block engaged with the lock slot is disposed on an outer wall of the adapter dust-proof cap.

* * * * *